United States Patent [19]
Stiltner

[11] 3,763,891
[45] Oct. 9, 1973

[54] CONTROL VALVE

[76] Inventor: Marshall A. Stiltner, 2700 Peterson Way, Apt. 28B, Costa Mesa, Calif. 92626

[22] Filed: Jan. 13, 1972

[21] Appl. No.: 217,447

Related U.S. Application Data

[63] Continuation-in-part of Ser. No. 129,153, March 29, 1971, abandoned, which is a continuation of Ser. No. 852,826, Aug. 25, 1969, abandoned.

[52] U.S. Cl........ 137/625.18, 137/625.68, 251/172, 251/174, 251/325
[51] Int. Cl............................................ F16k 11/06
[58] Field of Search.................. 137/625.18, 625.25, 137/625.48, 625.68, 625.67; 251/172, 174, 324, 325, 319, 282

[56] References Cited
UNITED STATES PATENTS

| 2,858,851 | 11/1958 | Holl | 137/625.48 X |
|---|---|---|---|
| 3,530,893 | 9/1970 | Masuda | 137/625.21 X |
| 2,980,137 | 4/1961 | Selwood | 251/319 |
| 3,482,816 | 12/1969 | Arnold | 251/174 X |
| 2,063,655 | 12/1936 | Barner | 251/174 |
| 2,394,487 | 2/1946 | Rotter et al. | 251/297 X |
| 2,998,828 | 9/1951 | Hare | 137/625.48 X |
| 3,190,313 | 6/1965 | Rumsey | 137/625.25 X |
| 3,432,141 | 3/1969 | Irti et al. | 251/172 |
| 3,457,957 | 7/1969 | Mueller | 137/625.68 |
| 3,556,151 | 1/1971 | Masuda | 137/625.21 |

Primary Examiner—William R. Cline
Attorney—Newton H. Lee, Jr.

[57] ABSTRACT

A control valve in which a slide is reciprocable in a body and tubular sealing elements have end faces slidably engaging an opposed face, the flow path being through the sealing elements and through the slide. Forces applied to the slide by fluid pressure and by the sealing elements are taken by support bearings which prevent the slide from cocking into engagement with the body.

33 Claims, 12 Drawing Figures

PATENTED OCT 9 1973 3,763,891

INVENTOR.
MARSHALL A. STILTNER
By
Newton H. Lee, Jr.

INVENTOR.
MARSHALL A. STILTNER
By
Newton H. Lee, Jr.

INVENTOR.
MARSHALL A. STILTNER

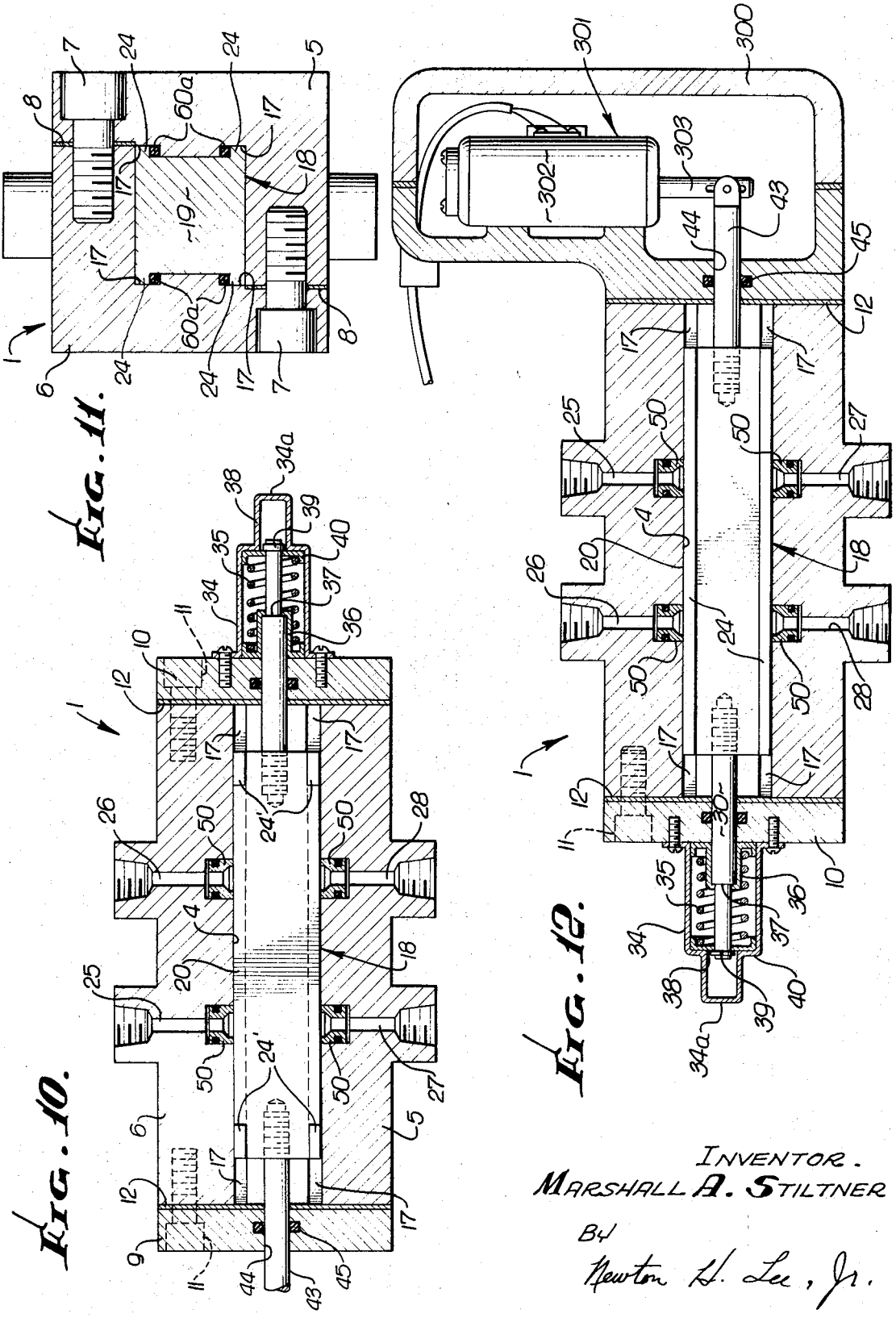

3,763,891

CONTROL VALVE

CROSS-REFERENCE

This application is a continuation-in-part of application Ser. No. 129,153, filed Mar. 29, 1971, now abandoned, which is a continuation of application Ser. No. 852,826, filed Aug. 25, 1969, now abandoned.

BACKGROUND OF THE INVENTION

Heretofore, spool valves have been provided in which the spool is sealed in a bore and is shiftable longitudinally in the bore to control the flow between the inlet and outlet ports. Sealing problems have imposed a limitation on the pressure ranges in which such valves are effectively operable. Such valves, moreover, experience difficulties due to the in-rush of the fluid when the valve spool is shifted to establish communication between the inlet and the outlet, so that such valves do not effectively throttle the flow of fluid over the range of operative positions and large forces are sometimes generated which create erratic valve movements. Such valves have not been entirely satisfactory when operated by servo mechanisms and in the typical servo system a dither valve has been incorporated in combination with the control valve, such dither valves themselves posing problems in operation.

In order to provide a valve having the variety of possible flow patterns and small size of the typical spool valves, various attempts have been made to provide a slide valve or linearly shiftable valve, wherein tubular seals circumscribe the flow passages and form a fluid tight seal with an opposing relatively movable face. An example of such a prior valve is illustrated in U.S. Pat. No. 2,858,851, granted Nov. 4, 1958, to Holl.

Such slide valves however experience friction problems which were difficult to overcome, and, therefore, powerful actuators are required. The friction which must be overcome to shift the slide from one position to another is the friction of the sealing elements sliding on the opposed sealing surface and the friction of the slide engaging the body when the slide cocks in the valve chamber, about an axis transverse to the direction of slide movement, into engagement with the body, under the influence of unbalanced fluid pressures in the various body ports at opposite sides of the transverse axis. The slide may also be forced to cock about a longitudinal axis and cause frictional resistance to shifting of the slide.

SUMMARY OF THE INVENTION

The present invention provides such a slide valve, wherein bearings are employed in such a manner as to reduce frictional resistance to slide movement, by supporting the slide within the body in such a manner that unbalanced forces acting on the slide cannot cause the slide to cock in any direction into frictional engagement with the body.

Only bearing friction need be overcome to shift the slide of the present valve, and, therefore, the valve is capable of being actuated by various means, including servo actuator means.

The present invention provides in the specific form illustrated, a slide type valve in which the valve slide has parallel opposed ribs which guide the slide in complemental grooves provided in the valve body, the slide having suitable passages or porting therein for conducting fluid between inlet and outlet or outlets, and the slide being essentially balanced to permit ease of shifting the slide.

More particularly, the invention provides a slide type valve wherein cylindrical sealing elements disposed in bores in the valve assembly have face-to-face sealing engagement with opposing slide surfaces whereby the flow through the valve assembly is confined to the passages in the slide and whereby effective throttling over the entire range of movement of the valve slide is accomplished. In addition, the longitudinally extending ribs provide longitudinally extended bearing surfaces in opposed parallel relation, and the inlet extends into the valve body at a right angle to the plane of the bearing surfaces, so that the valve slide is essentially in a balanced state, as forces acting on one side of the slide are transmitted to the bearings at the other side of the slide.

Since the major forces acting on the slide tend to cause the slide to cock on an axis transverse to the direction in which the slide is longitudinally shiftable, the bearing means which support the slide against cocking may be located, and in an illustrated form are located only adjacent the ends of the slide, and at both sides of the slide to prevent cocking about the longitudinal axis of the slide.

Among the objectives of the invention is the provision of a valve assembly which is leakproof, easy to operate at high pressures, reliable and easy to maintain.

This invention possesses many other advantages, and has other purposes which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

BRIEF DESCRIPTION OF THE DRAWINGS

FIG. 10 is a fragmentary longitudinal section showing a modified bearing arrangement;

FIG. 11 is a view corresponding to FIG. 3, showing another modified bearing construction; and FIG. 12 is a longitudinal section through a servo valve assembly embodying the invention.

DESCRIPTION OF THE PREFERRED EMBODIMENT

Figure 1:
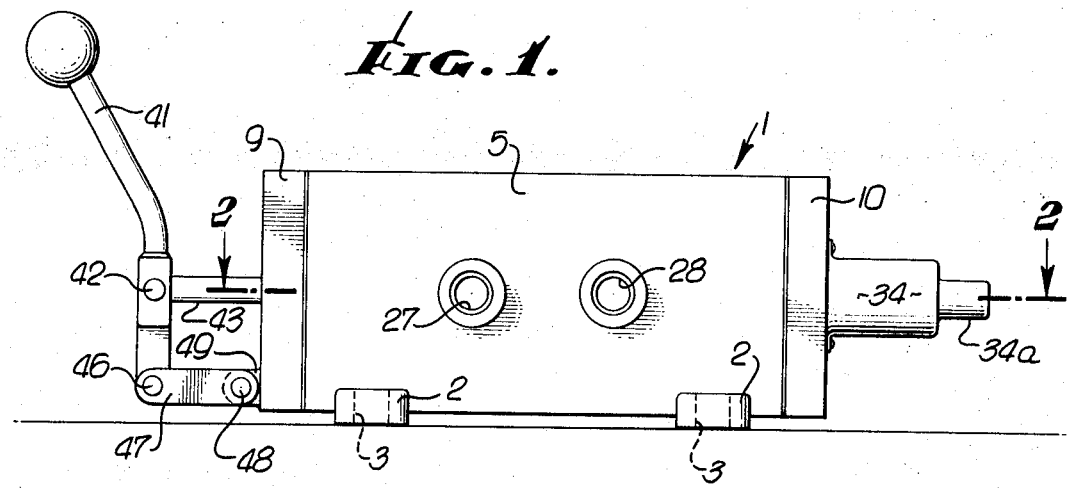
FIG. 1 is a side elevation of a valve assembly embodying the invention.

As seen in the drawings, the valve assembly comprises an elongated body 1 of any desired configuration adapted to enable application of the valve assembly to various mountings (not shown), for which purposes the body may be provided with appropriate mounting ears 2 in suitable locations, the ears having openings 3 for accommodating fasteners.

Figure 3:
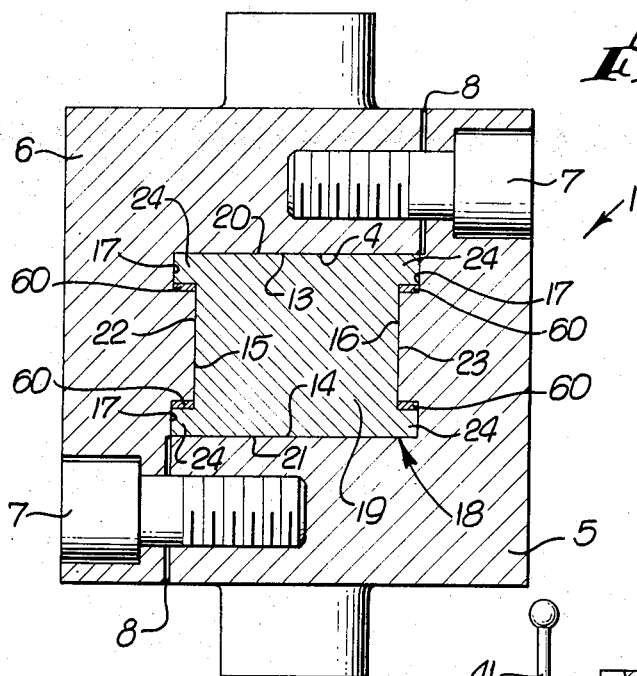
FIG. 3 is a transverse section as taken on the line 3—3 of FIG. 2.

Within the body 1 is formed a rectangular longitudinally extended chamber 4. Thus, the body 1 may be composed of complemental body parts 5 and 6, as seen in FIG. 3, secured together by appropriate cap screws 7, and appropriate sealing gaskets 8 are provided at the interface. At its ends, the body 1 is provided with end caps 9 and 10 which are also secured to the body 1 by appropriate cap screws 11, sealing gaskets 12 being interposed between the end caps 9 and 10 and the confronting faces of the ends of the body sections 5 and 6 of the body 1.

Referring to FIG. 3, it will be noted that the chamber 4 is defined by opposing, parallel, flat walls 13 and 14 and by opposing, parallel, flat walls 15 and 16 which are at right angles to the walls 13 and 14. At the juncture of the walls 13, 14 with the walls 15, 16, the body is provided with longitudinally extended grooves or channels 17 which extend in parallel relation to the planes of the walls 13 and 14 of the body 1.

Reciprocably disposed within the chamber 4 is a valve slide generally denoted at 18 having an external cross-sectional configuration complemental to the above-described cross-sectional configuration of the chamber 4. Thus, the slide 18 comprises a rectangular body 19 having opposite, parallel, flat faces 20 and 21, respectively slidably disposed between the walls 13 and 14 of the chamber 4. In addition, the slide 18 has parallel, opposite, flat faces 22 and 23 which are at right angles to the faces 20 and 21 and which are slidably disposed between the chamber walls 15 and 16. At the corners of the slide 18 are longitudinally extended, parallel ribs 24 which extend slidably within the grooves or channels 17 formed within the body 1, whereby the slide 18 is slidably supported within the body 1 for longitudinal movement with respect to a port 25. This port 25 in the illustrative embodiment now being described may be an inlet port and it extends into the body 1 in right angular relation to the slide face 20 and thus in right angular relation to the planes of the complemental grooves and ribs 17 and 24.

Figure 2:
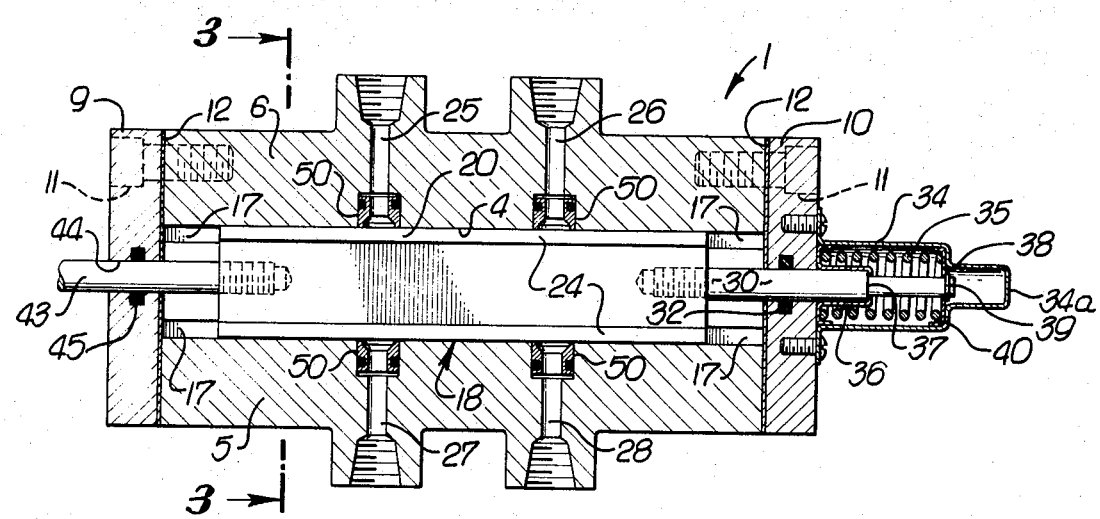
FIG. 2 is a horizontal section as taken on the line 2—2 of FIG. 1.

Referring more particularly to FIG. 2, it will be seen that the valve assembly is illustrated as a four-way valve, and in addition to the inlet 25, there is an outlet port 26 and a pair of outlet ports 27 and 28. The outlet ports 27 and 28 lead from the body 1 at the opposite side of the slide 18 from the inlet port 25.

Figure 5:
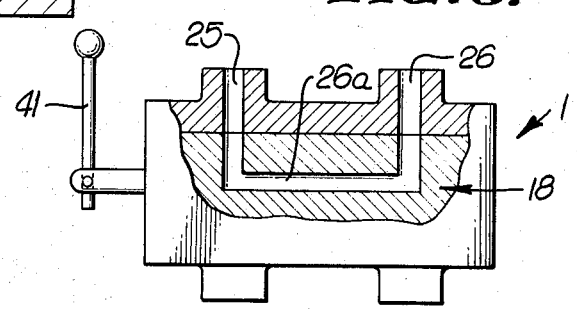
FIG. 5 is a diagrammatic view showing the valve slide in a closed position.
Figure 6:
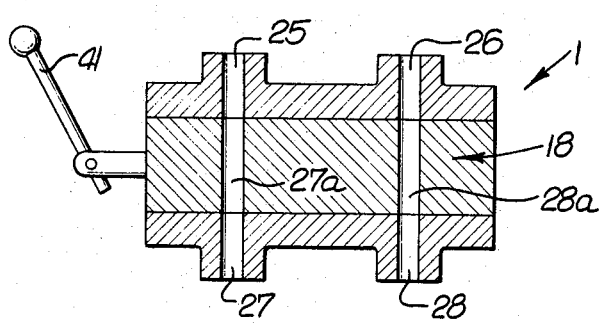
FIG. 6 is a view corresponding to FIG. 5 but showing the valve slide in a first flow position.
Figure 7:
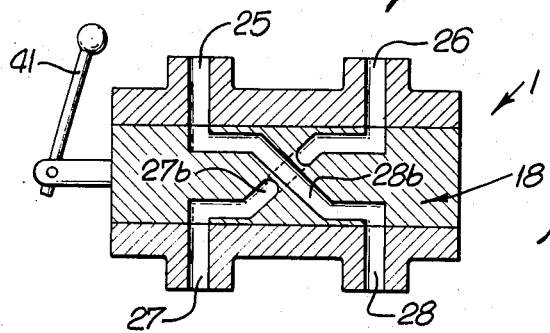
FIG. 7 is a diagrammatic view showing the valve slide in a second flow position.

As seen in FIGS. 5 through 7, the valve assembly of the present embodiment includes suitable porting or passageways in the slide 18 for controlling or directing the flow of fluid through the assembly. Thus, as illustrated in FIG. 5, when the valve slide 18 is in a middle position, a passageway 26a in the slide 18 will conduct the fluid from the inlet 25 to the port 26. On the other hand, when the slide 18 is shifted to the right, as viewed in FIG. 7, a passage 28b establishes communication between the port 25 and the port 28, and another passage 27b establishes communication between the port 26 and the port 27. It will be understood that the slide 18 may be provided with the above-described passages 25a through 28b in a suitable fashion, and that the illustrated passages are schematically or diagrammatically represenative of appropriate passageways or slide porting.

Means are provided for effecting longitudinal movement of the slide 18 between the various positions illustrated in FIGS. 5 through 7, and in the embodiment now being described, the slide 19 is spring loaded to a center position and is actuated to the right or to the left of the center position. More particularly, the end cap or closure 10 is provided, centrally, with a rod 30 extending through a bore 31 in the cap 10. An appropriate seal, such as an O-ring 32, is provided in the cap 10 and sealingly engages the rod 30. At its inner end, the rod 30 is threadedly engaged with, or is otherwise suitably connected to the slide 18.

Externally of the cap 10 in an enclosure 34, is a first spring seat 36 which is cup-like in form and which engages the rod 30 at a shoulder 37 on the rod 30. Also within the enclosure 34 is a second spring seat 38 which engages the rod 30 at a snap ring 39 disposed in opposed relation to the shoulder 37. Inward movement of the first spring seat 36 is limited by engagement with the end cap 10. Outward movement of the second spring seat 38 is limited by a flange 40 provided by the enclosure 34, the enclosure having an outwardly extended reduced section 40 coaxial with the rod 30, whereby the rod 30 is allowed to be moved outwardly with respect to the cap 10. Thus, movement of the slide 18 to the right effects compression of the spring 35 by outward movement of the spring seat 36 with the rod 30; while movement of the slide 18 to the left will effect compression of the spring 35 by movement of the spring seat 38 with the rod 30. The slide 18 is therefore resiliently constrained by the spring 35 to the middle position.

While various acuator means may be availed of for effecting movement of the slide 18 in either direction from the center position, including pilot operated means, various single and dual solenoid means (not shown), various manual actuators, or servo mechanisms, as will hereinafter be described, the embodiment of the invention illustrated in FIGS. 1 through 7 is shown as being operable by a hand operated lever 41. The lever 41 is pivotally connected as at 42 to the outer end of an actuator rod 43. This actuator rod 43 extends through a bore 44 in the end cap 9, and a suitable seal, such as an O-ring 45, is disposed in the bore 44 and engages the rod 43. The lever is pivotally connected as at 46 to a connector link 47 which is in turn pivotally connected as at 48 to an ear 49 projecting from the end cap 9.

Accordingly, it will be understood that movement of the lever 41 from a normal position as illustrated in FIGS. 1 and 5 is adapted to effect longitudinal movement of the slide 18 to the left and right positions as illustrated in FIGS. 6 and 7, respectively.

Figure 4:
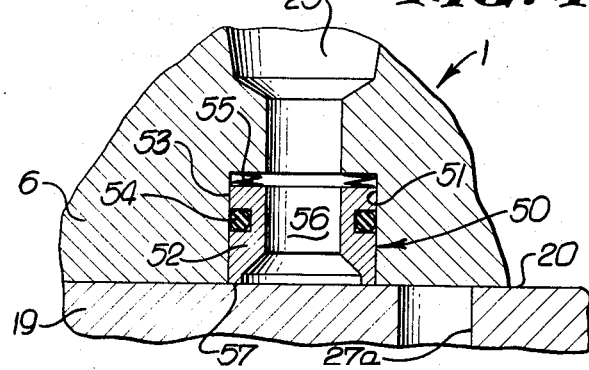
FIG. 4 is an enlarged fragmentary view in section illustrating one of the metal seals installed in one of the valve ports.

As seen in FIGS. 2 and 4, each of the ports 25 through 28 is provided with a metal seal generally indicated at 50. Thus, the body 1, at each of the ports, is provided with an enlarged bore 51. In the bore 51 is a tubular seal body 52 having an outer cylindrical wall closely seating within the bore 51, and the outer wall 53 of the seal 50 being provided with an O-ring 54 sealingly engaged within the bore 51. Preferably, the bore 51 is of a depth greater than the axial extent of the seal 50, whereby the bore 51 may accommodate a resilient back-up ring or spring 55 which is circumferentially undulated so as to apply a spring force biasing the seal 50 toward the confronting flat face of the slide 18. Fluid under pressure also acts on the seal 50 in this space. Extending axially through the seal body 52 is a bore 56, the bore 56 flaring outwardly at its inner end whereby the end face 57 of the seal body 52 which is in confronting relation with the flat face of slide 18 is formed as an annular face which is lapped to an optical flat for sliding and sealing engagement with the confronting flat face of the slide 18.

Thus, as is apparent from reference to FIG. 4 wherein the inlet port 25 and the passage 27a are illustrated, flow between the port 25 and the passage 27a is precluded by the face-to-face sealing contact between the annular end face 57 of the seal 50 and the flat face 20 of the slide 18. However, upon movement of the slide 18 to the left, that is, to the position shown in FIG. 6, the flow between the port 25 and the passage 27a will be progressively metered as the port 25 and the passage 27a are brought progressively into registry. However, since such communication is progressive and since the passage 27a extends through the slide 18, the establishment of communication between the port 25 and the passage 27a does not subject the slide to forces attributable to the in-rush of fluid. Correspondingly, the same metering action occurs if any of the passageways in the slide 18 are brought into registry with the bores 56 through any of the seals 50.

Since the inlet port 25 extends into the body 1 at a right angle to the planes of the ribs 24, ease of sliding movement of the slide 18 is enhanced due to the balancing of the forces on the slide along the ribs 24, which prevents cocking or binding of the slide 18 within the chamber 24. In this connection the ribs 24 may closely fit the grooves 17 for relative sliding movement. However, in accordance with the embodiment as illustrated in FIG. 3, suitable bearing strips 60 may be interposed between the ribs 24 and the opposing faces of the walls 15 and 16 so as to reduce friction therebetween.

Figure 8:
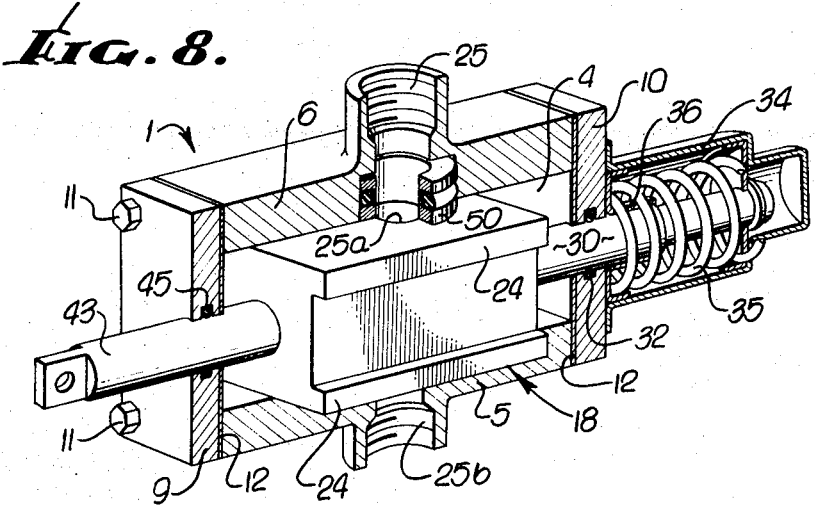
FIG. 8 is a view in perspective with parts broken away showing a typical shutoff valve embodying the invention.

Referring now to FIG. 8, there is illustrated a typical shut-off valve in which the valve body 1 is provided with the chamber 4 in which the slide 18 is reciprocable, the slide having ribs 24 as in the previously described embodiment, slidably engageable in companion grooves within the body 1. In the inlet port 25 is a metal seal 50 as previously described. The actuator rod 43 extends through the end cap 9 and a spring biased rod 30 as the other end of the slide 18 extends through the end cap 10.

Since in the shut-off valve configuration, the valve is moved only in one direction by the actuator rod 43, the spring seat 36 engages the inner end of the spring 35 and the outer end of the spring 35 abuts with the spring enclosure 34, so that the valve slide 18 is normally biased to the left. The body 1 includes an outlet 25b which would also include a typical metal seat 50 and in the illustrated position of the valve slide 18, flow is permitted from the inelt 25 to the outlet 25b through the valve passage 25a, but when the actuator rod 43 is shifted to the right, the slide 18 will be correspondingly shifted, ultimately shutting off flow through the passage 25a. In the shut-off position, the fluid pressure acting on the slide within the seal 50 will be distributed and balanced across the slide 18 along the ribs 24.

Figure 9:
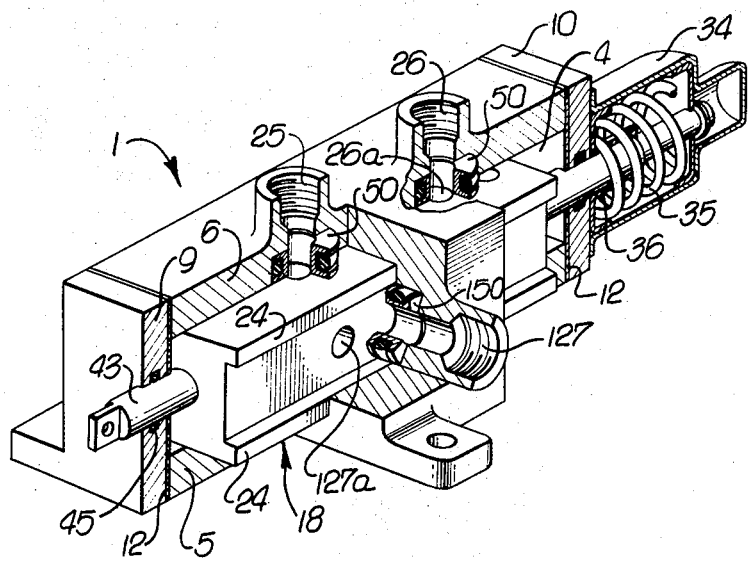
FIG. 9 is a view corresponding to FIG. 8 showing a typical 3-way valve.

Referring now to FIG. 9, a further modification is illustrated in the form of a three-way or diverter valve assembly. As in the previously described embodiment, the body 1 has end caps 9 and 10 and is provided with a chamber 4 in which the slide 18 is reciprocable. The actuator rod 43 may be suitably reciprocated to effect movement of the slide 18 from the position shown in FIG. 9 to the alternate position, against the biasing forces of spring 35, which as in the case of the shut-off valve of FIG. 8, engages the seat 36 and the outer end of the enclosure 34, to normally bias the slide 18 to the left. The body 1 has the ports 25 and 26 adapted to communicate through the passage 26a in the slide 18. In the present embodiment, however, there is a port 127 which is laterally disposed with respect to the body 1 as compared with the previously described embodiments. More particularly, the port 127 extends through a side of the body 1 and the metal seal 150 engages the flat face 22 of the slide 18 between the pair of ribs 25. In the alternate position in the embodiment of FIG. 9, flow is diverted to the passage 127a, through which fluid may flow from the port 25 to the port 127. Various other flow arrangements may be availed of as distinguished from that shown in FIG. 9, the significant factor being that one or more outlet ports may be arranged so that the metal seal slidably engages a face of the slide 18 between the ribs 24. Notwithstanding such a modification, the slide 18 is nevertheless balanced by the force of fluid entering the assembly through either port 25 or the port 26.

The valve assembly of the present invention is not limited to simple valve assemblies but may be compounded by the utilization of a manifold having suitable passageways therein adapted to variously communicate with the ports of the valve body.

In any event, the valve construction is such that lower pressure drop occurs across the valve at a given flow rate, as compared with the usual spool valves, since the internal passages of the present valve communicate with the inlet and outlet ports in such a manner as to provide for laminar flow. Thus, a comparatively small valve can be employed in lieu of a spool valve of substantially larger size. The metal seals have a zero leakage characteristic and the body of the valve, that is, the chamber 4, is not pressurized by the fluid medium flowing through the valve, and only the slide is subjected to the pressure of the fluid medium. The valve assembly is thoroughly leakproof and is capable of substantial pressure as compared with the usual spool valve. It should be understood in this connection that if desired, the chamber 4 may be pressurized from an external source so as to reduce the load on the ribs 24.

Furthermore, it will be understood that while the metal seals have been herein illustrated as being in the valve body 1 and coengageable with flat surfaces of the slide, this structure may be reversed by the placement of the metal seals in the slide.

As seen in FIG. 10, the bearing means which support the slide in the body are located adjacent to the ends only of the slide since the load is essentially taken at the ends of the slide in certain positions of the slide where the force tends to cock the slide about an axis transverse to the direction of slide movement. In other words, the bearings are located to support the slide at opposite sides of the passages in both a longitudinal and a transverse direction.

More particularly, referring to FIG. 10, it will be seen that the ribs, designated 24', are short rib sections, spaced apart longitudinally of the slide and laterally projecting into the grooves 17 at or adjacent to the opposite ends of the slide.

Referring to FIG. 11, there is illustrated a modified construction wherein balls 60a are shown as bearing elements interposed between the ribs 24 and the opposing surfaces of the body sections 5 and 6 of the body 1, whereby to reduce bearing friction. In this construction, as is apparent from FIG. 11, the body and the slide provide opposing walls forming ball races which cooperate to contact the balls on four opposing locations. Since the angles of the races in the slide are included within the slide, all forces tending to rotate the slide are equally distributed about the slide.

In FIG. 12, there is illustrated a valve which in most respects is identical to the valve assembly in FIG. 1, and, therefore, the same reference characters are applied. However, in the embodiment of FIG. 12, the actuator rod 43 extends into the housing 300 of a servo mechanism, generally denoted at 301. Since in the present valve construction, the slide travel is linear, the frictional resistance to movement is low, and the extent of travel is predictable, due to the fact that the slide has no tendency to shift responsive to fluid in-rush, a characteristic of spool type valves, the present valve advantageously lends itself to combination with a servo mechanism. In the illustrated embodiment, an electric servo motor 302 is adapted to shift a crank arm 303 as indicated by the arrow in FIG. 12 to effect linear motion of the slide 18. The bias of the spring 34 provides a force which can be offset by the motor to shift the slide to its alternate positions. While a four-way valve is herein illustrated as being controlled by the servo motor 302, it will be understood that various other valve configurations may be combined with the servo motor, due to the construction of the present valve.

From the foregoing, it is apparent that the present invention provides a slide valve of the type employing tubular seals slidably engaged with an opposing sealing surface through which the flow passages extend, wherein the slide is supported on the bearing means which are operatively, or functionally, interposed between the slide and the body in such a manner that the load applied to the slide tending to cock it in the body is taken by the low-friction bearing elements which are effectively on planes disposed at right angles to the direction of the application of force to the slide by the seals, and by fluid pressure in the ports. The same general function, of course, can be accomplished by functionally interposing bearings or load bearing means in specific manners other than as shown, without departing from the invention.

I claim:

1. A control valve comprising: a body having an elongated chamber, a slide shiftable longitudinally in said chamber, inlet and outlet passages in said body, said slide having passage-ways therethrough for communication between said inlet and outlet passages, said slide and said body having cooperative ribs and grooves for guiding said slide within said chamber, means for shifting said slide in said chamber, and face-to-face sealing means interposed between said body and said slide to divert the flow between said passages and passageways and to prevent the flow of fluid into said chamber, said sealing means comprising a tubular seal element having a port therethrough, a flat end face on said seal element, one of said body and said slide having a companion flat face engageable by the flat face of said seal element, the other end of said seal element being exposed to fluid pressure to force the flat end face of said sealing element into engagement with said companion flat face, and the confronting faces of said ribs and grooves being on planes normal to the direction of the force applied to said slide by said seal element.

2. A control valve as defined in claim 1, wherein said cooperative ribs and grooves include elongated ribs on said slide and complemental grooves in said body.

3. A control valve as defined in claim 1, wherein said slide is rectangular and said ribs extend along the corners of said slide, said chamber being complemental to said slide and having grooves along the corners of said chamber slidably receiving said ribs.

4. A control valve as defined in claim 1, wherein said slide is rectangular and said ribs extend along the corners of said slide, said chamber being complemental to said slide and having grooves along the corners of said chamber slidably receiving said ribs, and including bearing means in said grooves engaged with said ribs.

5. A control valve as defined in claim 1, wherein said slide is rectangular and said ribs extend along the corners of said slide, said chamber being complemental to said slide and having grooves along the corners of said chamber slidably receiving said ribs, and including bearing strips in said grooves engaged with said ribs.

6. A control valve as defined in claim 1, wherein said slide is rectangular and said ribs extend along the corners of said slide, said chamber being complemental to said slide and having grooves along the corners of said chamber slidably receiving said ribs, and including bearing balls in said grooves engaged with said ribs.

7. A control valve as defined in claim 1, wherein the means for shifting said slide includes spring means at one end of said slide for biasing said slide in one direction, and actuator means at the other end of said slide for shifting said slide in the other direction.

8. A control valve as defined in claim 1, wherein the means for shifting said slide includes spring means at one end of said slide for holding said slide in a center position, and actuator means at the other end of said slide for shifting said slide in either direction from said center position.

9. A control valve as defined in claim 1, wherein the means for shifting said slide includes a servo motor connected to one end of said slide.

10. A control valve as defined in claim 1, wherein the means for shifting said slide includes a spring means at one end of said slide for biasing said slide to one position, and servo motor means at the other end of said slide for shifting said slide to another position.

11. A control valve as defined in claim 1, wherein the means for shifting said slide includes spring means at one end of said slide for biasing said slide to one position, and electric servo motor means at the other end of said slide for shifting said slide to another position.

12. A control valve as defined in claim 1, including at least one additional outlet leading from said body between said ribs at one side of said slide.

13. A control valve comprising: a body having an elongated chamber of rectangular cross section, end closures for said chamber, a slide of rectangular form disposed in said chamber, parallel ribs projecting from said slide, said body having parallel grooves slidably receiving said ribs, inlet and outlet ports in said body, each of said ports having a sealing sleeve therein providing a central bore and an annular flat end surface slidably engaged with said slide, each of said sealing sleeves having its other end exposed to pressure to force said end surface into engagement with said slide, said ribs and surfaces of said body forming said grooves confronting in planes normal to the direction of the force applied to said slide by said sealing sleeves, said slide having passage means therein for conducting fluid between said ports, said passage means opening in the flat sides of said slide, and means for shifting said slide longitudinally in said body.

14. A control valve as defined in claim 13, wherein said means for shifting said slide includes a rod extending into said body through an end closure.

15. A control valve as defined in claim 13, wherein said means for shifting said slide includes a rod extending into said body through an end closure, and means sealing said rod in said end closure.

16. A control valve as defined in claim 13, including bearing means in said grooves engaged with said ribs.

17. A control valve as defined in claim 13, wherein said slide has ribs at each corner, and said body has a companion groove for each rib.

18. A control valve as defined in claim 13, wherein said means for shifting said slide includes servo motor means having an operative connection with said slide.

19. A control valve as defined in claim 13, wherein said slide has ribs at each corner, and said body has a companion groove for each rib, said body having walls defining said groove and said slide and said rib having walls opposing said body walls to form a bearing space which is square in cross-section, and including ball bearings in said spaces engaging all of said walls to slidably support said slide with respect to said body.

20. A control valve as defined in claim 13, wherein said means for shifting said slide longitudinally in said body includes a rod projecting from an end of said slide through one of said end closures, and including a similar rod projecting from the other end of said slide through the other end closure, and sealing means between each of said rods and end closures.

21. A control valve as defined in claim 13, wherein said body is composed of a pair of L-shaped complemental body half parts secured together to form said chamber therebetween, said end closures being secured to said half parts.

22. A control valve comprising: a body having an elongated chamber, end closures for said chamber, an elongated slide disposed in said chamber, ports providing inlet and outlet passage means at longitudinally spaced locations in said body, said slide having ports providing passage means for conducting fluid between said ports, sealing means interposed between said body and said slide and including annular seals circumscribing certain of said ports, each of said seals having a flat end face engageable with an opposing flat face through which certain other ports open for controlling the flow of fluid between said passage means through said slide, each of said seals also having its other end face exposed to pressure in its port to force the flat end face into engagement with said slide, said body and said slide having on opposite sides of said slide walls defining opposing ball races extending longitudinally in said chamber and on said slide, bearing balls in said races, said ball races and balls providing means for holding said slide against cocking in said chamber under the influence of forces imposed on said slide by said seals, and operating means for shifting said slide in said chamber to establish and interrupt fluid flow through said passage means.

23. A control valve as defined in claim 22, wherein said ball races define a square in cross-section and engage said balls on four sides.

24. A control valve as defined in claim 22, wherein said ball races define a square and engage said balls on four sides, and the angles of the ball races in said slide are all included in the slide.

25. A control valve as defined in claim 22, wherein said operating means includes a rod projecting from one end of said slide through one of said end closures, and including a similar rod projecting from the other end of said slide through the other end closure, and sealing means between each of said rods and end closures, whereby the ends of said slide are pressure balanced in said chamber.

26. A control valve comprising: a body having an elongated chamber closed at its ends, an elongated slide longitudinally shiftably disposed in said chamber, ports providing inlet and outlet passage means in said body, said slide having longitudinally spaced ports providing passage means for conducting fluid between said ports, sealing means interposed between said body and said slide and including tubular seals circumscribing certain of said ports, one of said body and said slide having a flat face through which certain of said ports open, each of said seals having a flat end face engageable with the first-mentioned flat face for controlling the flow of fluid between said passage means through said slide, each of said seals also having its other end face exposed to pressure in its port to apply a force to the seal urging its flat end face into engagement with the first-mentioned flat face, said body having elongated bearing surfaces extending longitudinally in said chamber and opposed to said slide and located in planes normal to the direction of application of force to said slide by said seals, bearing means interposed between said bearing surfaces and said slide, said bearing means being laterally spaced at opposite sides of said ports of said body and said slide for holding said slide against cocking in said chamber into binding engagement with said body under the influence of the force applied to said seals about an axis extending longitudinally of said chamber and about an axis extending transversely of said chamber, and operating means for shifting said slide in said chamber to establish and interrupt fluid flow through said passage means.

27. A control valve as defined in claim 26, wherein said bearing means comprises rolling bearing elements.

28. A control valve as defined in claim 26, wherein said bearing means comprises ball bearings.

29. A control valve as defined in claim 26, wherein said bearing means comprises bearing strips.

30. A control valve as defined in claim 26, wherein said bearing means comprise bearing members carried at the ends of said slide and engaged with opposed portions of said body spanning said inlet and outlet passage means.

31. A control valve comprising: a body having an elongated chamber closed at its ends, an elongated slide longitudinally shiftably disposed in said chamber, ports providing inlet and outlet passage means in said body, said slide having longitudinally spaced ports providing passage means for conducting fluid between said ports, sealing means interposed between said body and said slide and including tubular seals circumscribing certain of said ports, one of said body and said slide having a sealing face through which certain of said ports open, each of said seals having an end sealing face engageable with the first-mentioned sealing face for controlling the flow of fluid between said passage means through said slide, means for urging said sealing end face of said seals into engagement with the first-mentioned sealing face, bearing means interposed between said body and said slide and located in planes normal to the direction of application of force to said slide by said seals for supporting said slide at its opposite sides and at its ends for holding said slide against cocking in said chamber into binding engagement with said body under the influence of forces applied to said slide about an axis extending longitudinally of said chamber and about an axis extending transversely of said chamber, and operating means for shifting said slide in said chamber to establish and interrupt fluid flow through said passage means.

32. A control valve as defined in claim 32, wherein said bearing means comprise bearing members carried at the ends of said slide and engaged with opposed portions of said body.

33. A control valve as defined in claim 31, wherein said operating means includes servo-motor means, and a member extending from said body and connecting said slide with said servo-motor means.

* * * * *